United States Patent [19]

LeMay

[11] 4,356,834

[45] Nov. 2, 1982

[54] VAPOR FEED REGULATOR

[76] Inventor: Dan B. LeMay, 1736 Addison Rd., Palos Verdes Estates, Calif. 90724

[21] Appl. No.: 90,566

[22] Filed: Nov. 2, 1979

[51] Int. Cl.³ .............................................. G05D 11/10
[52] U.S. Cl. ......................................... 137/89; 73/29; 137/93
[58] Field of Search ........................ 137/3, 88, 89, 93; 73/17 A, 29; 261/64 R, 130, DIG. 65; 236/44 R

[56] References Cited

U.S. PATENT DOCUMENTS

| | | | |
|---|---|---|---|
| 3,252,319 | 5/1966 | Wood et al. ........................ | 73/17 A |
| 4,220,460 | 9/1980 | Partus ......................... | 261/DIG. 65 |

Primary Examiner—Robert G. Nilson
Attorney, Agent, or Firm—Fulwider, Patton, Rieber, Lee & Utecht

[57] ABSTRACT

The invention is a system for controlling the mass flow rates of vapor and carrier gas in a flowing fluid mixture. A regulated flow of carrier gas is divided so that a fraction of the flow passes through a vaporizer to pick up the vapor while the balance bypasses the vaporizer. The streams are then recombined and the resulting mixture is passed through a dew point detector which gives an output signal which varies according to variations in the mass ratio of the vapor to the carrier gas. A controller responds to the detector signal to generate a control signal which modulates a valve to vary the fraction of the carrier gas passing through the vaporizer, thereby influencing the mass rate at which the vapor is introduced. The feedback control from the dew point detector to the valve is adapted to regulate the dew point, and thereby the mass ratio of vapor to carrier. Since carrier mass flow rate is separately regulated, the regulation of the mass fraction of vapor in the blend results in the regulation of vapor mass flow rate as well.

7 Claims, 2 Drawing Figures

VAPOR FEED REGULATOR

BACKGROUND OF THE INVENTION

1. Field of the Invention

The present invention relates to a system for controlling the mass flow rate of vapor in a carrier gas.

2. Description of the Prior Art

In certain vapor-phase chemical processes, such as are encountered in the manufacture of semi-conductors, it is necessary to precisely meter the input mass flow rate of liquid chemicals as minor vapor-phase constituents of a flowing gaseous atmosphere.

In a typical system for the manufacture of semi-conductors a carrier gas such as hydrogen is introduced into a vaporizer where it is passed over or through a liquid source such as silicon tetrachloride to pick up vapor for discharge into a reaction chamber in which a portion of the vapor material is deposited upon a semiconductor wafer or the like. The mass flow rate of the silicon tetrachloride vapor must be very accurately controlled in order to deposit a precise thickness of the vapor material on the wafer.

Regulation of vapor mass flow rate is accomplished in the prior art in various ways. In one system the temperature and pressure of the liquid in the vaporizer, and the flow of carrier gas through the vaporizer, are closely regulated to maintain constant the amount of vapor taken up by the carrier gas. This system is difficult to control because of variations which are present in the degree of saturation of the vapor in the carrier gas.

Another prior art vapor feed regulation system measures the ratio of vapor to carrier gas as the mixture leaves the vaporizer. This is done by thermal conductivity analysis, the flow rate of carrier gas being controlled to yield the desired vapor feed rate, as determined by the analysis. This type of system is limited by the accuracy of the thermal conductivity analysis, and the vapor is typically undesirably exposed to contamination from the heated conductivity cells which characterize the analysis. Typical of this type of prior art system is that which is disclosed and claimed in U.S. Pat. No. 3,650,151, issued Mar. 21, 1972 for FLUID FLOW MEASURING SYSTEM.

Yet another system of the prior art involves metering the rate of flow of the liquid source to a flash vaporizer where it is vaporized in a carrier gas stream. This system does not work well for extremely low flow rates, and particularly where chemicals are involved which are corrosive. The metering is imprecise and subject to contamination under these conditions.

SUMMARY OF THE INVENTION

According to the present invention, a system is provided for detecting the mass ratio of vapor to a carrier gas. The system is characterized by precise regulation of both carrier gas flow rate and vapor flow rate, and extreme purity of the resultant fluid mixture by avoidance of exposure of the vapor to temperatures above ambient or to materials other than quartz or the like.

The present system includes a mass flow controller for regulating the flow of carrier gas, and a vaporizer for introducing vapor into a portion of the carrier gas to provide a fluid mixture. This mixture is diluted by mixing with the balance of the regulating flow of carrier gas. The resultant mixture is applied to a detection means which generates a detector signal which varies according to the mass ratio of the vapor to the carrier gas. The detector signal is applied to a controller which generates a control signal varying in accordance with variations in the detector signal.

The control signal from the controller adjusts the operation of the modulating means which controls the portion of the carrier flow bypassing the vaporizer. Depending upon the mass of the vapor constituent of the fluid mixture from the vaporizer, the proportion of diluent carrier gas is increased or decreased until a predetermined constant mass ratio is achieved.

In one embodiment detection of the mass ratio of vapor to carrier gas is achieved through the use of a dew point cell. For a predetermined desired constant mass ratio of vapor to carrier gas, incipient condensation will occur in the cell at a given pressure and temperature. The dew point cell temperature is therefore adjusted at a predetermined "set point" at which incipient condensation will occur at the desired constant mass ratio of vapor to carrier gas.

Other objects and features of the present invention will become apparent from consideration of the following detailed description taken in connection with the accompanying drawings.

DESCRIPTION OF THE PREFERRED EMBODIMENT

Figure 1:
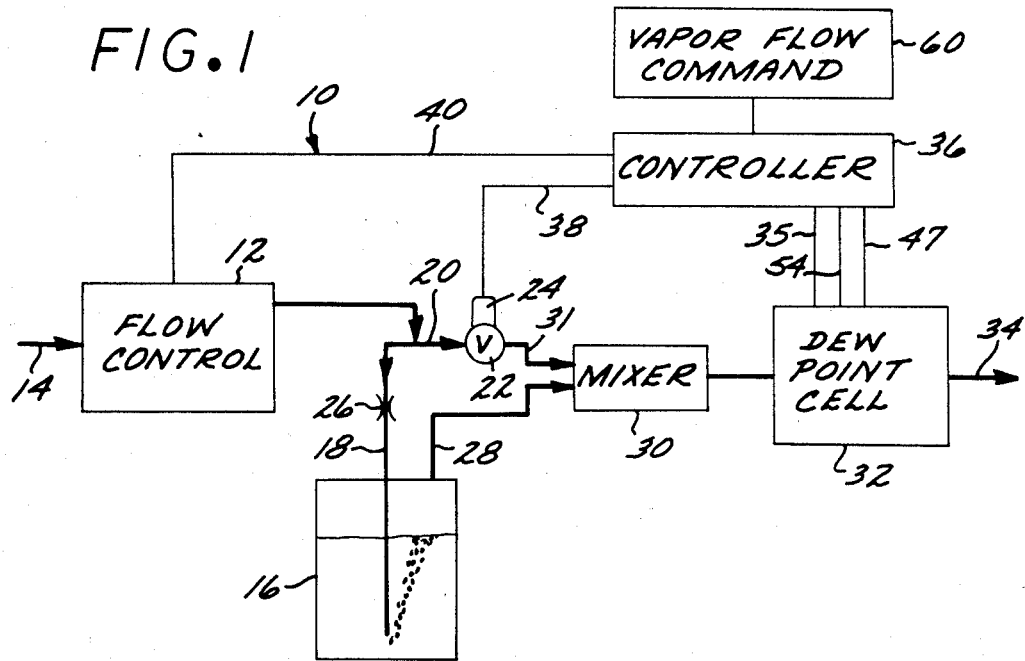
FIG. 1 is a diagrammatic view of the system of the present invention.

The present system 10 is adapted for detecting the mass ratio of vapor to a carrier gas and comprises, generally, a flow control means 12 into which the carrier gas enters at 14 from any suitable source. The flow control means 12 is operative to regulate the mass flow rate of carrier gas to the remainder of the system.

The carrier gas flow from the flow control means 12 is divided into two paths, one flowing to a vaporizer 16 through an inlet conduit 18, the other through a bypass conduit 20 to a modulating means 22. The means 22 includes a valve under the electromagnetic control of a solenoid 24 or the like for controlling operation of the valve in response to certain control signals, as will be seen. Adjustment of the modulating means 22 in response to such control signals determines the amount of carrier gas flowing through the means 22 and bypassing the vaporizer 16.

It is possible for the valve of the modulating means 22 to be a three-way modulating valve in which the flow is divided between conduits 18 and 20. It could also be a single valve in either the conduit 18 or the conduit 20, with a restriction in the other conduit. In the embodiment illustrated, the valve is shown as a single valve in the bypass line 20, with a suitable flow restriction 26 being shown in the conduit 18.

The flow restriction 26 is required only to give the modulating means 22 sufficient pressure drop to maintain control. Depending upon the pressure drop characteristics of the vaporizer 16 and the associated conduits, restriction 26 may optimally be a pressure-relief valve or the like, a fixed restriction, or might be eliminated.

Carrier gas flowing into the vaporizer 16 picks up vapor from the liquid source in the vaporizer 16 and the resulting fluid mixture passes through a discharge conduit 28 to a mixer 30.

The bypass or diluent carrier gas from the modulating means 22 also passes to the mixer 30, through a conduit 31, and the two streams are recombined, mixed and passed through a dew point cell 32. The cell 32 is adapted to sense the dew point of the fluid mixture at a dew point temperature for which the cell 32 is adjusted. As will be apparent to those skilled in the art, assuming a constant discharge or atmospheric pressure and a constant temperature in the cell 32, the detector signal generated by the cell 32 will indicate incipient condensation in the cell corresponding to a particular or predetermined constant mass ratio of vapor to carrier gas in the fluid mixture passing from the cell 32 to a discharge conduit 34. As will be seen, the system is operative to maintain such a predetermined constant mass ratio automatically by modulating operation of the means 22.

Detector signals from the cell 32 are indicated diagramatically as passing through electrical leads 35 and 47 to a controller 36 electrically coupled to the means 22 and the flow control means 12 by electrical leads 38 and 40, respectively.

Once the predetermined constant mass ratio of vapor to carrier gas is established by the control signals applied to the modulating means 22, control signals applied to the flow control means 12 through the lead 40 are operative to provide a range of regulated total mass feed rates to the discharge conduit 34.

With particular reference to the individual components constituting the present system 10, the flow control means 12 may comprise an inexpensive manual control such as a rotameter/needle-valve assembly or a mechanical pressure regulator/needle-valve type. However, it preferably comprises a valve, a flow sensor, feedback control circuit and an associated proportional solenoid or the like so that the valve can be electronically controlled remotely by a controller such as the controller 36. Since the flow control means 12 must regulate the total carrier gas flow it should be operative over a relatively wide control range. Various suitable flow control means for this purpose are commercially available, as will be apparent to those skilled in the art.

The modulating valve 22, like the flow control means 12, preferably comprises a valve adapted to be remotely controlled by control signals acting upon an associated proportional-solenoid 24. Any valve arrangement would be suitable so long as it is operative to control the division of flow between the vaporizer via conduit 18 and bypass via conduit 20 in response to control signals from a controller such as the controller 36.

The particular construction of the vaporizer 16 is not a part of the present invention. It is simply a container for solid or liquid chemicals such as liquid silicon tetrachloride. The vaporizer 16 may be any of various commercially available units operative to pass carrier gas over or through the contained material so that some of the material vaporizes or sublimes for discharge through the conduit 28 to the mixer 30.

The confluence of the conduits 28 and 31 may provide sufficient turbulence for adequate mixing, but the mixer 30 is preferably provided to insure against stratification of the streams passing to dew point cell 32. The streams should be thoroughly mixed to avoid any sensing by the dew point cell 32 of non-representative fluid mixture samples.

Various suitable mixers for this purpose are commercially available, and selection of the proper mixer will depend upon the particular liquid and carrier gas involved, as well as other circumstances such as producibility and cost, required pressure drop for adequate mixing, internal volume and surface area, and cleanability. The mixer can include a moving element such as an impeller or the like, but a motionless type is preferred. A suitable motionless mixer could be of the type characterized by flow passage shapes resulting in mixing by turbulence, velocity differences, or the like. Known types include screens or perforated plates arranged transversely of the flow path; an ejector system in which one stream is introduced into the other at high relative velocity; butterfly baffles in the form of short twisted vanes dividing the flow stream and introducing swirl in opposite directions sequentially; and jumbled short tubes oriented randomly in the path of fluid flow to produce a criss-crossing, sheared flow.

The mixer 30 need not be a separate element, as schematically shown in FIG. 1. It could be integrated with a conduit juncture or the dew point cell 32.

The dew point cell 32 is a preferred means for determining the mass ratio of vapor to carrier gas in the stream discharged from the mixer 30. The cell 32 is particularly effective by reason of its operation on the principle that the concentration of a binary mixture of a vapor and a gas at a given pressure has a unique value for a given dew point. Thus, if the dew point is known, the mass ratio of vapor to carrier gas is also known. It has the further advantage that its operating conditions are inherently related to the vaporizer conditions; i.e. the temperature-pressure-concentration conditions for the vaporizer operation and dew point detector operation will be similar. This similarity permits a wider range of source material vapor pressures to be accommodated so that diverse vapor-carrier combinations can be accommodated without changing the detector type. In selecting a suitable dew point cell from the commercially available types, certain characteristics are desirable.

The cell 32 should be operated at dew point temperatures lower than the ambient temperature. Otherwise, undesirable condensation might occur on the conduits or other elements of the system through which the fluid mixture passes. This would adversely affect the accuracy of sensing by the cell 32. Of course, the temperature in the vaporizer 16 and the selected dew point of the mixture must also be at or below ambient temperature in the typical commercial processes for which the present system is designed. The effective ambient temperature can, of course, be increased by heat tracing or by enclosing all critical portions of the system in an oven.

The cell 32 should be selected for operation over a relatively wide range of flow rates to take advantage of the full flow range of the flow control means 12. That is, once fluid flow from the cell 32 is regulated at a constant mass flow ratio of vapor to carrier gas, the cell 32 should be capable of providing higher and lower rates of flow at that particular dew point, within the range of the flow control means 12.

The material of the interior envelope of the dew point cell 32 is preferably pure fused quartz to provide corrosion and contamination protection. In addition, the internal envelope should have a minimal internal volume and surface area for sensitivity to relatively low mass flow rates. Other desirable characteristics will suggest themselves to those skilled in the art, having in mind the particular application at hand.

Figure 2:
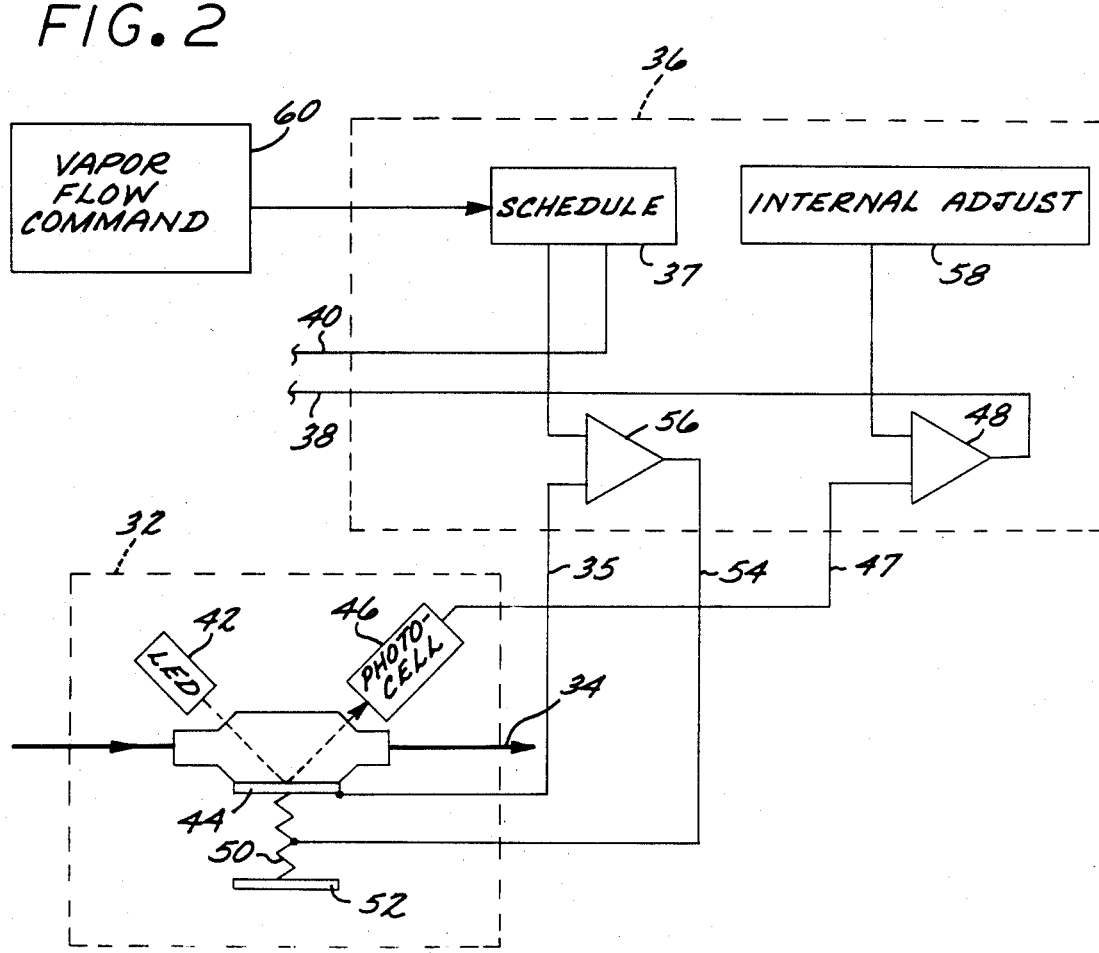
FIG. 2 is a schematic view of the controller and dew point detection portions of the system of FIG. 1.

With reference to FIG. 2, there is illustrated a dew point cell 32 which is representative of one form of a cell capable of generating appropriate detector signals for application to the controller 36.

A conventional light-emitting diode or LED 42 energized by suitable supporting circuitry (not shown) angularly projects light on a thermoelectrically cooled sensing mirror 44 over which the fluid mixture sample is passed. Light reflected from the mirror 44 is sensed by a conventional photodetector or photocell 46 and converted into a detector signal which is applied through the lead 47 to an amplifier 48, the detector signal varying as a function of the amount of vapor condensation on the mirror 44. The amplifier 48 forms a part of the controller 36.

Although the dew point is sensed optically in the illustrated cell 32, other systems are available for sensing dew point, such as by capacitance, and the present system comprehends such variations.

The intensity of reflected light to the photocell 46 changes according to the degree of condensation on the mirror 44. Occurrence of incipient condensation is adjustable by controlling the temperature of the mirror 44, as sensed by a thermistor, platinum resistance thermometer, or the like (not shown) located on the mirror 44. Temperature control is by means of suitable thermoelectric cooling means 50 connected between the mirror 44 and a heat sink 52.

Signals from the photocell 46 are applied by a lead 47 to an amplifier 48 forming part of the controller 36.

Electrical signals from the temperature transducer on the mirror 44 are applied to an amplifier 56 through the lead 35 and, depending upon the command signal or setting provided by a schedule 37, the amplifier 56 responds through an electrical lead 54 to operate the cooling means 50 to achieve a predetermined mirror temperature.

The controller 36 may take any form suitable to perform the functions herein indicated, as will be apparent to those skilled in the art, the particular embodiment described being merely exemplary.

The controller 36 includes an internal adjustment means 58 of a variable voltage or resistance type to establish the "set point" for the amplifier 38. Deviation from the set point effects generation of an opening or a closing signal by the amplifier 48 by application to the modulating means 22. The amplifier 48 compares the detector signal applied to it through lead 47 with the set point signal coming from the internal adjustment means 58 and, if the mirror 44 indicates excessive condensation, the valve 22 is caused to modulate towards open to dilute the fluid mixture coming from the mixer 30. If the mirror 44 indicates little or no condensation, the signal from the amplifier 48 causes the valve 22 to modulate towards closed and thereby increase the proportion of carrier gas passing through vaporizer 16.

The particular construction of the components of the controller 36 do not form a part of the present invention and the brief description herein made is intended primarily to guide those skilled in the art in recognizing the characteristics of the component which are important to a selection of suitable components.

The selection of an amplifier 48 should be made having in mind that there are likely to be system lags due to plumbing transport delay, that is, a delay in the flow of the carrier gas and fluid mixture through the various conduits and components of the system. Also there will be probable lags resulting from the dynamics of the dew point cell. Consequently, amplifier 48 should be dynamically compensated to provide stable performance under these circumstances, as by incorporation of suitable capacitors, as will be apparent. The capacitance values should be selected to maximize the gain of the system, while reducing settling time and accumulated control error following upsets. The purpose of this control loop remains to develop a vapor/gas mixture having a dew point temperature equal to that of the mirror 44.

The selection of the amplifier 56 depends upon similar considerations. It is a relatively simple temperature controller with an electronically commanded set point provided by the "schedule" circuit. More particularly, the amplifier 56 compares the temperature of the mirror 44 with the set point command from the schedule circuit 37, such as by means of a suitable thermocouple, thermistor, or like signal, for energization of the thermoelectric cooler 50 such that the mirror temperature is controlled to the commanded value.

The schedule circuit 37 is also responsive to a command setting fed into it by a suitable vapor flow command 60, which establishes the total mass flow rates of carrier gas and vapor delivered by this system. Thus, the circuit 37 provides a combination of carrier gas flow rate and dew point temperature command signals to the flow control means 12 and amplifier 56, respectively.

A number of different schedules to accomplish the foregoing will immediately suggest themselves to those skilled in the art. For example, the carrier flow could be held constant by flow control 12 and the dew point temperature varied to change the regulated vapor carrier ratio to give the desired vapor flow rate. The command provided by the schedule 37 to amplifier 56 should for convenience be linearly related to the mass ratio of vapor to carrier, and thereby to the mass flow rate of the vapor from the dew point cell 32. Since the dew point temperature is a nonlinear function of the ratio of vapor to carrier gas, a nonlinear dew point temperature signal provided by a circuit such as a thermistor circuit could be used for appropriate linearization. In addition, this command signal could be corrected for absolute pressure, if required by the particular application.

Alternatively, the dew point temperature, and therefore the vapor-carrier ratio, could be held constant by fixed set points in amplifiers 48 and 56, while the flow through flow control 12 is varied to give the desired delivery rate of both vapor and carrier flows at this fixed ratio.

As a third schedule possibility, both flow through control 12 and dew point could be varied to give the widest possible adjustment range of vapor feed rate.

Regardless of the command schedule used, in operation, the carrier gas passes through the flow control means 12 to the modulating means 22, and to the vaporizer 16. The vaporized liquid from the vaporizer 16 is then carried by the carrier gas to the mixer 30, where it is mixed with carrier gas coming from the modulating means 22.

The mixture passes through the dew point cell 32 for discharge into the reactor (not shown) by means of the conduit 34. In passing through the cell 32 a detector signal is generated by the photocell 46 which is compared in the amplifier 48 with the signal developed by the set point command provided by the internal adjustment means 58. This yields a control signal from the amplifier 48 which opens or closes the valve of the modulating means 22 until the predetermined amount of condensation exists on the mirror 44 to correspond with the desired dew point temperature.

The consequence of the foregong operation is very accurate regulation of mass ratio of vapor to carrier gas, and also regulation of the absolute mass flow rate of both vapor and carrier gas.

In the event that it is desired to control only the ratio of vapor to carrier, then the flow control means 12, which controls the carrier flow rate, can be deleted. This does not interfere with operation of the modulating means 22 and therefore that control loop still controls the ratio of vapor to carrier.

Although the foregoing description has been particularly directed to an application in which carrier gas picks up vapor from a liquid source in a vaporizer, it is also applicable to a carrier gas acting upon a sublimed solid, and the terminology used is to be construed as comprehending such a sublimed solid. Thus, terms such as "condensation" are to be interpreted to include desublimation, and are not to be limited to the phase changes characteristic of liquids.

Moreover, although the use of the dew point cell 32 in the present system is believed to be unique, it is contemplated that other means may be utilized which operate to generate a detector signal correponding to deviations from a predetermined condition such as incipient condensation or the like. Since the detection device senses incipiency of condensation, or, more generally, the proximity of the vapor phase to a phase change condition, it need not be a dew point cell. More particularly, a binary mixture of vapor in carrier gas, wherein the vapor would change phase if its concentration were sufficiently high, that is, if its partial pressure equalled the total pressure of the mixture, has a "critical" condition wherein its phase change is incipient. This critical condition is characterized by the following independent parameters:

(1) Vapor/carrier mass ratio;
(2) Temperature; and
(3) Pressure.

Since there are no other significant independent variables, the detector device is most generally described in terms of these independent variables and without definition of the dependent variable observed or the detection mechanism used to transduce it.

Various modifications and changes may be made with regard to the foregoing detailed description without departing from the spirit of the invention.

I claim:

1. A system for controlling the mass ratio of species in a flowing binary mixture of a vapor and a carrier gas, said system comprising:
   first carrier gas means operative to provide a first flow of carrier gas;
   vaporizer means coupled to said first carrier gas means for introducing a vapor into said first flow of carrier gas to provide fluid mixtures which are characterized by different mass ratios of vapor to carrier gas;
   second carrier gas means bypassing said vaporizer means and operative to provide a controlled second flow of carrier gas;
   conduit means for combining said second flow of carrier gas with said first flow of carrier gas and said vapor introduced into said first flow of carrier gas to provide a combined flow;
   detector means responsive to incipiency of vapor phase change, said detection means being coupled to said conduit means and adapted to sample said combined flow to provide a detector signal varying in accordance with deviation of the condition of said combined flow from said point of incipiency;
   controller means coupled to said second carrier gas means and responsive to said detector signal to generate a control signal to control the flow rate of said second flow of carrier gas thereby to adjust the mass ratio of vapor to carrier gas in said combined flow whereby said detector signal is maintained at a commanded value; and
   means for controlling the temperature within said detector means whereby said point of incipiency is made to correlate with the mass ratio of vapor to carrier gas in correspondence with said commanded value.

2. A system according to claim 1 wherein flow control means is provided to control the total carrier flow available to said first carrier gas means and said second carrier gas means thereby to provide regulation of carrier gas flow and consequently vapor mass flow rate.

3. A system according to claims 1 or 2 wherein said detector means is a dew point cell having a condensing plate in the path of said combined flow, and wherein said means for controlling the temperature is coupled to said plate for adjusting the magnitude of said temperature.

4. A system according to claim 3 wherein said plate is reflective, and said dew point cell includes means for projecting light onto said plate at the point of said incipiency, and further includes means responsive to the intensity of light reflected from said plate to provide said detector signal.

5. A system according to claims 1 through 4 wherein said conduit means includes mixer means operative to mix said first and second flows upstream of said detector means.

6. A system for controlling the mass ratio of species in a flowing binary mixture of a vapor and a carrier gas, said system comprising:
   flow control means operative to provide first and second flows of carrier gas;
   vaporizer means coupled to said flow control means to accept said first flow for introducing a vapor into said first flow to provide fluid mixtures which are each characterized by a dew point corresponding to a particular mass ratio of vapor to. carrier gas.
   vapor phase-change detection means coupled to said vaporizer means and adapted to sample said fluid mixtures to provide a detector signal which varies according to variations in the phase change point;
   controller means responsive to said detector signal to generate a control signal which varies in accordance with variations in said detector signal; and
   modulating means coupled to said flow control means to accept and introduce said second flow into said first flow downstream of said vaporizer means, and responsive to variations in said control signal to control the rate of flow of said second flow thereby to regulate the phase change point of the combined said first and second flows entering said vapor phase change point detection means.

7. A system according to claim 6 and including vapor flow command means for generating a command signal corresponding to a desired total mass flow rate, said controller means being responsive to said command signal as a set point for said control signal.

* * * * *